I. S. Brown,

Saw Teeth,

Nº 31,073. Patented Jan. 8, 1861.

Witnesses:
Charles N. Brown
Nathan E. Brown

Inventor
Iros S. Brown

UNITED STATES PATENT OFFICE.

IRA S. BROWN, OF HOPKINTON, RHODE ISLAND.

SAW-TOOTH.

Specification of Letters Patent No. 31,073, dated January 8, 1861.

*To all whom it may concern:*

Be it known that I, IRA S. BROWN, of Hopkinton, in the county of Washington and State of Rhode Island, have invented a new and Improved Saw-Tooth for Planing Lumber at the Same Time that It is Sawed; and I do hereby declare that the following is a full, clear, and exact description of the same, reference being had to the accompanying drawings, in which—

Figure 1:
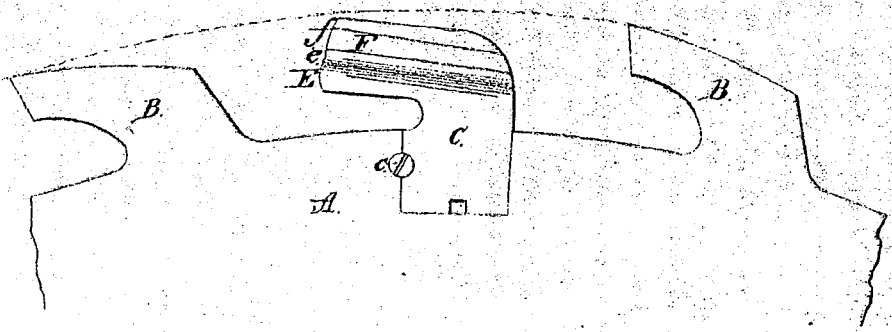
Figure 2:
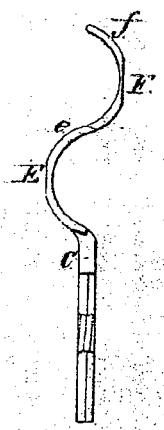

Figure 1 is a view of a portion of a circular saw with my improved tooth attached, and, Fig. 2 is an edge view of the tooth on a larger scale.

Similar letters of reference indicate like parts in all the drawings.

By this device, I am enabled to do better work than by any heretofore known to me, the stuff leaving the saw in as smooth a condition as a board which has been passed through an ordinary planing machine.

To enable others skilled in the art to make and use my invention I will proceed to describe its construction and operation by the aid of the drawings and of the letters of reference marked thereon.

A is an ordinary circular saw with teeth B in any proper form.

My improved tooth C is made separately and is fastened in the saw by a dovetail joint and a binding screw $c$, in the manner represented, which is familiar to sawyers. That portion of my improved tooth which projects beyond the saw is swaged into a form somewhat like the letter S, but with flattened sides as is more clearly shown in Fig. 2. Each half of the edge is beveled on its hollow side, and the exterior of each curve is flattened, for a short distance, parallel to the plane of the saw as shown at the letters E, F. The width of this flattened space should be varied according to the number of my improved teeth which are used in the saw, but where but one is used, which I find to be sufficient, it should be made a little more than equal to the amount of feed at each revolution.

The operation is as follows: The tooth being placed in the saw with its exterior a little within the points of the cutting teeth as shown in Fig. 1, and the lumber being fed thereto the cutting teeth acting in the usual manner open a narrow kerf always a little in advance of the planing tooth. As the latter enters the kerf the curved portions of its edge $e$, $f$, immediately exterior to the flattened edge act as gouges widening the aperture, and partly smoothing it. At the next revolution the lumber has been fed forward sufficiently to cause the gouge portion $e$, $f$, to cut away a new portion while the plane portions E, F, pass immediately in the path described by $e$, $f$, at the preceding revolution, smoothing off any irregularities which they may have left, and giving the surface upon each side of the kerf a smooth and finished appearance. The cutter acting on both sides at once has no tendency to spring the saw and cause ridges in the work, and as it bears for a distance behind the cutting edge all spring is prevented even when passing through knots or other places of unequal hardness. The ogee or S form allows the chips to pass freely through without clogging from each cutter while it gives a very stiff tooth with so little weight as not to disturb the balance of the saw.

I am aware that certain forms of saw teeth have been used for the purpose of planing lumber at the same time that it is sawed, and I do not claim broadly the employment of a saw tooth for such a purpose but,

Having now fully described my improved saw tooth what I claim as new therein and desire to secure by Letters Patent is,

The employment in saws of one or more planing teeth having a form substantially as herein described, that is to say having a section at right angles to the line of motion of a form analogous to the letter S, so as to present separate cutting surfaces for each side of the kerf so nearly opposite as to support each other, and so arranged that each of the two cutting edges has a separate and independent passage for the escape of its chips, substantially as herein set forth.

In testimony whereof I have hereunto set my name in the presence of two subscribing witnesses.

IRA S. BROWN.

Witnesses:
CHARLES N. BROWN,
NATHAN C. BROWN.